United States Patent [19]

Struhs et al.

[11] Patent Number: 4,855,823
[45] Date of Patent: Aug. 8, 1989

[54] IMAGING ASSEMBLY AND MOUNTING FOR SURVEILLANCE VIEWING UNDER REMOTE CONTROL

[75] Inventors: Kenneth E. Struhs; Mark J. Struhs; Patrick L. Struhs, all of Salt Lake City, Utah

[73] Assignee: Applied Engineering Products Co., Salt Lake City, Utah

[21] Appl. No.: 190,365

[22] Filed: May 5, 1988

[51] Int. Cl.$^4$ ............................................. H04N 7/18
[52] U.S. Cl. .................................... 358/108; 358/229; 358/87; 74/479
[58] Field of Search ................. 358/229, 108, 87, 100, 358/99; 354/81; 74/479; 901/47

[56] References Cited

U.S. PATENT DOCUMENTS

| | | | |
|---|---|---|---|
| 3,175,037 | 3/1965 | Padgitt | 358/99 X |
| 3,732,368 | 5/1973 | Mahlab | 358/108 |
| 3,993,866 | 11/1976 | Pearl et al. | 358/229 X |
| 4,080,629 | 3/1978 | Hammond et al. | 358/229 C |
| 4,160,999 | 7/1979 | Claggett | 358/229 X |
| 4,764,008 | 8/1988 | Wren | 358/229 X |

OTHER PUBLICATIONS

"CTV Equipment", Fordham Radio Spring Catalog; Apr. '87.

Primary Examiner—Edward L. Coles, Sr.
Assistant Examiner—Victor R. Kostak
Attorney, Agent, or Firm—Philip A. Mallinckrodt; Robert R. Mallinckrodt

[57] ABSTRACT

An integrated, miniaturized, imaging assembly, comprising microscope size and arrangement, video camera lenses having the objective lens in a mount that is preferably a blackened sphere and that is pivotally mounted in a supporting structure rearwardly of but adjacent to the objective lens, so the forward end of the lens mount can be placed within a concave dome of unusually small and shallow size with the remainder of the imaging assemby outside of and behind the concavity of such viewing dome, and can be tilted and panned to sweep over a broad viewing area with minimum intrusion thereinto. The imaging assembly includes an electronic image-acquisition device, in line with the optical axis of the lenses, and electronic camera circuitry preferably remote therefrom. An easily movable, tripod type of mount for the imaging assembly is adapted to rest on ceiling or other structure in which the viewing dome is mounted.

38 Claims, 4 Drawing Sheets

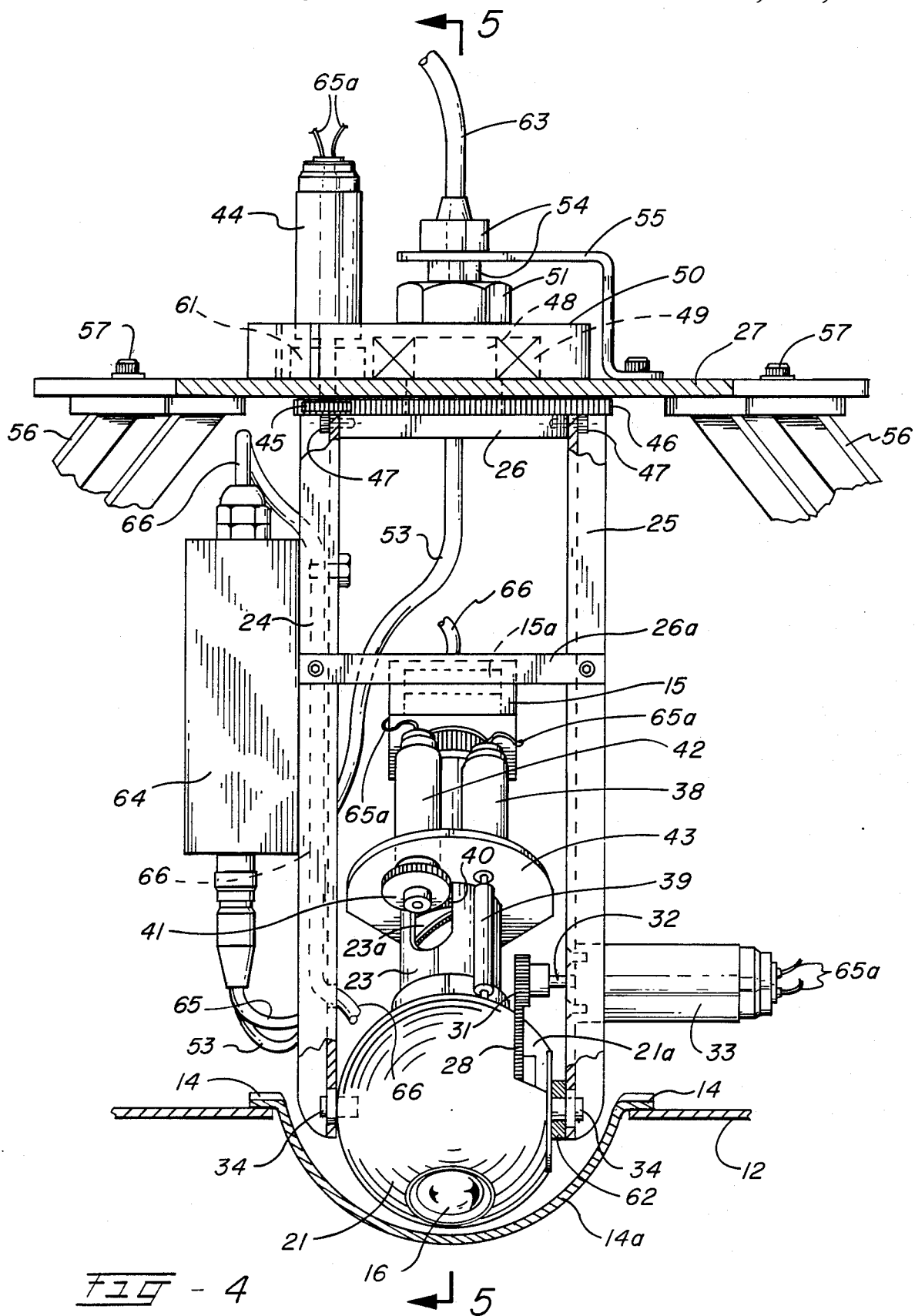

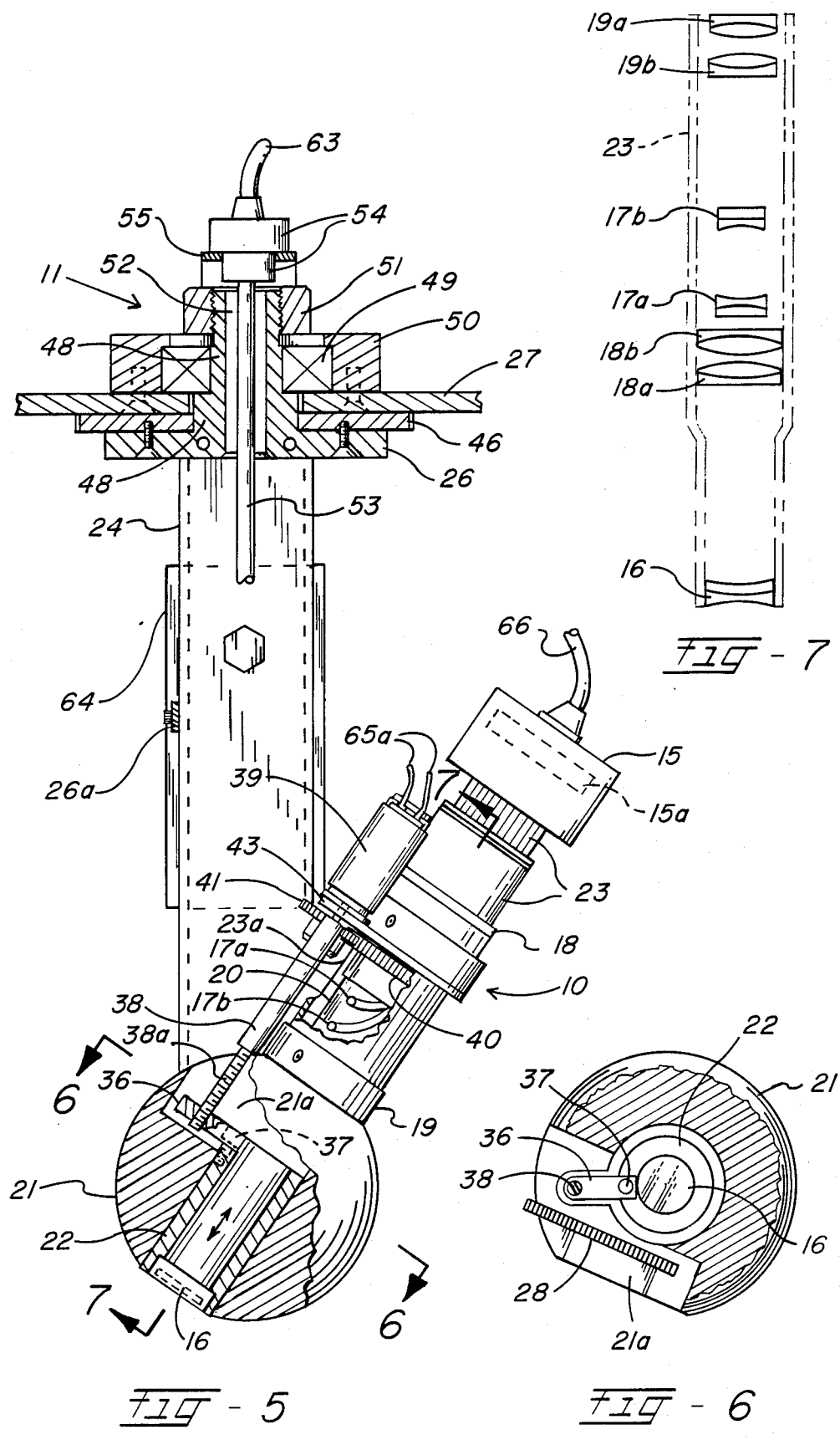

IMAGING ASSEMBLY AND MOUNTING FOR SURVEILLANCE VIEWING UNDER REMOTE CONTROL

BACKGROUND OF THE INVENTION

1. 1. Field

The invention is in the filed of remotely and robotically controlled television cameras, including lens systems and mountings therefor, especially as adapted for covert, surveillance purposes.

2. State of the Art

Motorized surveillance television cameras, including those utilizing electronic imaging devices, usually hang into the dome of a dome fixture from a mounting in a ceiling of an area to be watched. However, these cameras and their mountings are very heavy and require special supporting structure other than the ceiling itself. Moreover, they require that the viewing domes of these fixtures be of larger diameter (typically twelve inches or larger) to provide adequate viewing of areas to be watched. These domes protrude deeply into the areas to be watched and are conspicuous and unsightly.

SUMMARY OF THE INVENTION

A principal purpose in the making of the invention was to provide a fully integrated, robotic, imaging assembly and mounting therefor for positioning behind a small and inconspicuous viewing dome, with the objective lens of an optical lens arrangement projecting into the dome and mounted for wide sweep tilting and panning viewing movement relative to such dome, which is of minimum width (typically five inches in diameter or less) and depth (typically one and three-quarters inches or less) that minimizes protrusion into the viewing area.

A feature of the invention is accomplishing this purpose is the positioning of the objective lens of the optical lens arrangement in a mount therefor and the pivoting of such mount, for tilting and panning movement, rearwardly of but adjacent to the objective lens in mounting means that supports the imaging assembly.

Another purpose was to provide such an assembly and mounting of very light weight (typically ten pounds or less) that can rest on a tile or grill of an accoustical ceiling provided with one or more viewing dome fixtures, and that can easily be moved from one dome fixture to another.

Features of the invention for the accomplishment of this purpose are the incorporation, into the imaging assembly, of a miniature optical lens system heretofore designed in general for and utilized in a microscope, but not in a video surveillance camera; the use of an electronic, image-acquisition, charge-coupled device optically aligned with the lens arrangement and electrically connected with remotely-positioned, electronic camera circuitry; and a simple, height-adjustable, tripod type of mounting means for the imaging assembly.

A further purpose was to provide simple but effective mechanical mounting means for the objective lens and for the entire imaging assembly, including remotely controlled electric motors, limit switches, and parking brakes for tilting and panning movements, whereby any light reflection through the dome fixture would be minimized, if not eliminated altogether, without resorting to the usual practice of placing double domes in the dome fixture.

Features of the invention for the accomplishment of this purpose are the employing of a spherical mount for the objective lens, blackening the spherical surface of such mount, and the pivoting of the spherical mount between a pair of arms depending from a turntable in a platform constituting part of the mounting means for the imaging assembly.

THE DRAWINGS

The best mode of carrying out the invention in actual practice is illustrated in the accompanying drawings, in which:

FIG. 1 represents a pictorial view of an integrated imaging assembly supported in accordance with the invention for remotely controlled, surveillance purposes above the ceiling of an area to be watched through a relatively small and inconspicuous dome fixture in such ceiling, the ceiling and dome fixture being shown in vertical section and the integrated imaging assembly being shown at one of the wide angle scanning positions through which it is adapted to sweep;

FIG. 2, a top plan view of the embodiment of FIG. 1;

FIG. 3, a schematic representation of the surveillance viewing area covered by the sweep of the imaging assembly of the invention;

FIG. 4, a vertical section taken on the line 4—4 of FIG. 2, viewed apart from the ceiling and dome fixture;

FIG. 5, a vertical axial section taken on the line 5—5 of FIG. 4;

FIG. 6, a horizontal section taken on the line 6—6 of FIG. 5; and

FIG. 7, a vertical section taken on the line 7—7 of FIG. 5, the barrel and lenses of the lens system being indicated schematically and in non-zoom positions.

DETAILED DESCRIPTION OF THE ILLUSTRATED EMBODIMENT

It should be realized that many different structural arrangements can be utilized in carrying out one or more of the several purposes and objectives of the invention within the generic purview of the several enumerated above, as will be apparent to those skilled in the art seeking to take advantage of the teachings herein. However, the illustrated embodiment described in detail hereinafter represents the best mode presently contemplated for taking full advantage of all aspects of the invention.

Figure 3:
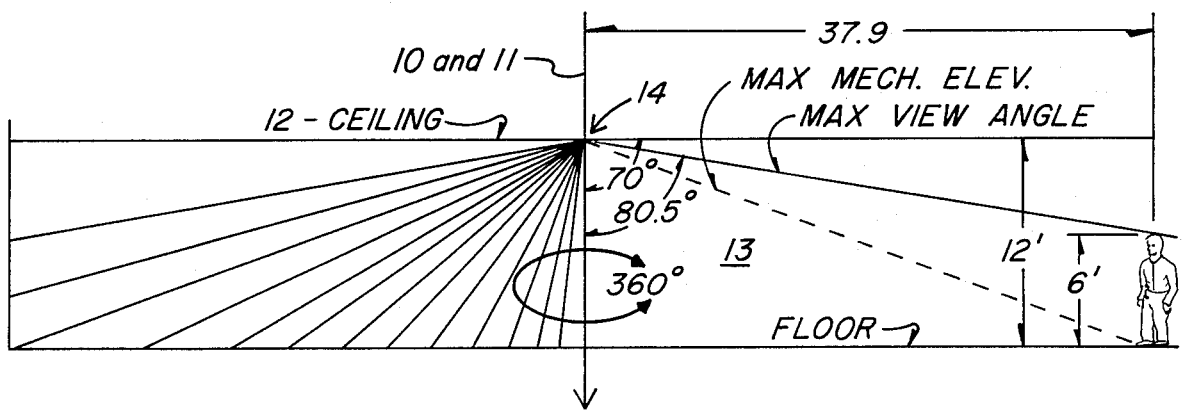

Thus, in the form illustrated, the invention comprises a fully integrated, electronic, imaging assembly, indicated generally 10, supported by mounting structure, indicated generally 11, placed on the ceiling 12 (shown somewhat schematically) of an area 13, see particularly FIG. 3, such as a merchandise display and sales area, to be watched by combined panning and tilting movement of such imaging assembly 10 for possible shop-lifting or other improper activities.

The imaging assembly 10 is miniaturized, so as to be unusually small and lightweight and supportable by readily portable mounting structure resting directly on typical ceiling structure such as a tile or grill of an accoustical ceiling, and so as to accomplish its surveillance function through the concave dome 14a of an unusually small dome fixture 14 in ceiling 12.

As shown, imaging assembly 10 includes a high resolution, light sensitive, charge-coupled, electronic image-acquisition device 15a, that is protectively mounted along with customary electronic circuitry in a box 15. Such device 15a is readily obtainable on the open market as a printed circuit chip, e.g. produced in Japan by Fujitsu, Sony, or Hitachi, and produced in the U.S. by R.C.A. or Texas Instruments.

Imaging assembly 10 also includes an arrangement of lenses, FIGS. 5 and 7, unique to video surveillance cameras but used heretofore in microscopes, which provides for desired miniaturization of the assembly. This lens arrangement as here employed comprises a uniquely-mounted objective, i.e. focusing, lens 16 that is small with minimal tell-tale light reflectivity, and a pair of zoom lenses 17a and 17b between fixed lenses 18a and 18b and 19a and 19b. The zoom lenses are conventionally mounted, as shown generally at 20, with camming pins and guide slots for back and forth relative movement away from and toward each other, respectively, as they are moved simultaneously forwardly or backwardly. A standard video surveillance camera has an objective lens that is at least one and a half inches in diameter, while the microscope lens system of the present invention is about one-half that size or less.

In accordance with one aspect of the invention, objective lens 16 is positioned in a spherical mount 21 in a slidable tube 22 for focusing movement back and forth along an axis of the sphere within a passage of the spherical mount coincident with such axis. Spherical mount 21 is rigidly interconnected with box 15 by a barrel housing 23 in which zoom lenses 17a and 17b and fixed lenses 18 and 19 are mounted, so that image-acquisition device 15a is in optical alignment with the lens system. Optical alignment means only that device 15a is positioned to receive images transmitted by the lens system, which may be of any suitable geometric configuration, even to the extent of incorporating one or more mirrors as do some optical configurations known to the art.

So as to be capable of both panning and tilting movement relative to dome 14a of dome fixture 14, with maximum sweep over an area to be watched, imaging assembly 10 has the spherical mount 21 for objective lens 16 pivoted diametrically of the sphere between a pair of arms 24 and 25, respectively, that depend from a turntable 26, FIG. 5, supported by a platform 27 of mounting structure 11. The arms are held firmly in position relative to each other by a crossbrace 26a.

With the diameter of spherical mount 21 being three inches, imaging assembly 10 can be placed above ceiling 12 so that objective lens 16 extends deeply into the concavity of a five inch diameter dome, and, with say a one and three-quarter inch maximum depth for such concavity of the dome, such objective lens 16 can sweep over a considerably larger viewing area, see 13 of FIG. 3, than can corresponding video cameras of the prior art mounted relative to much larger viewing domes.

Figure 1:
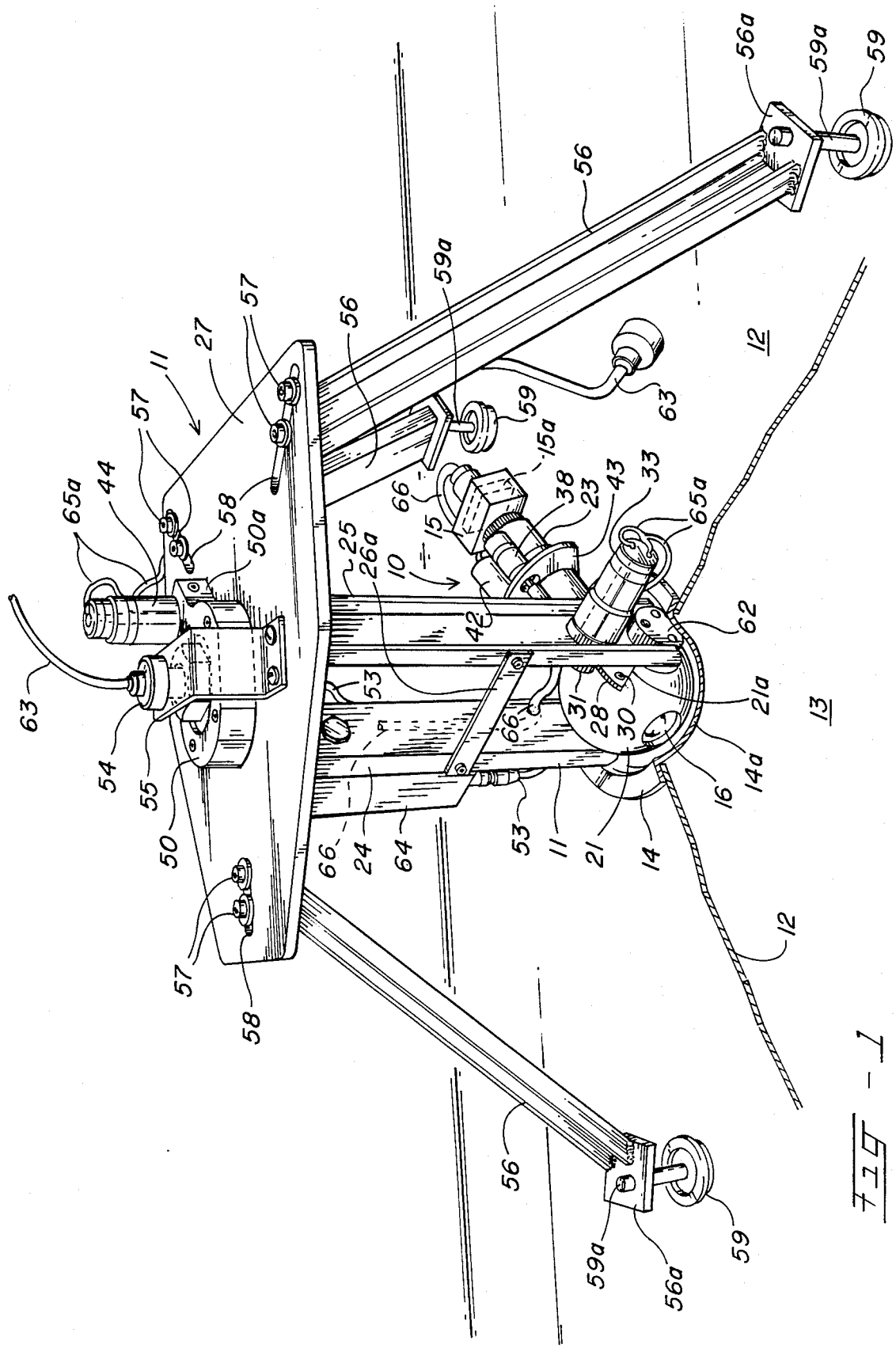
Figure 2:
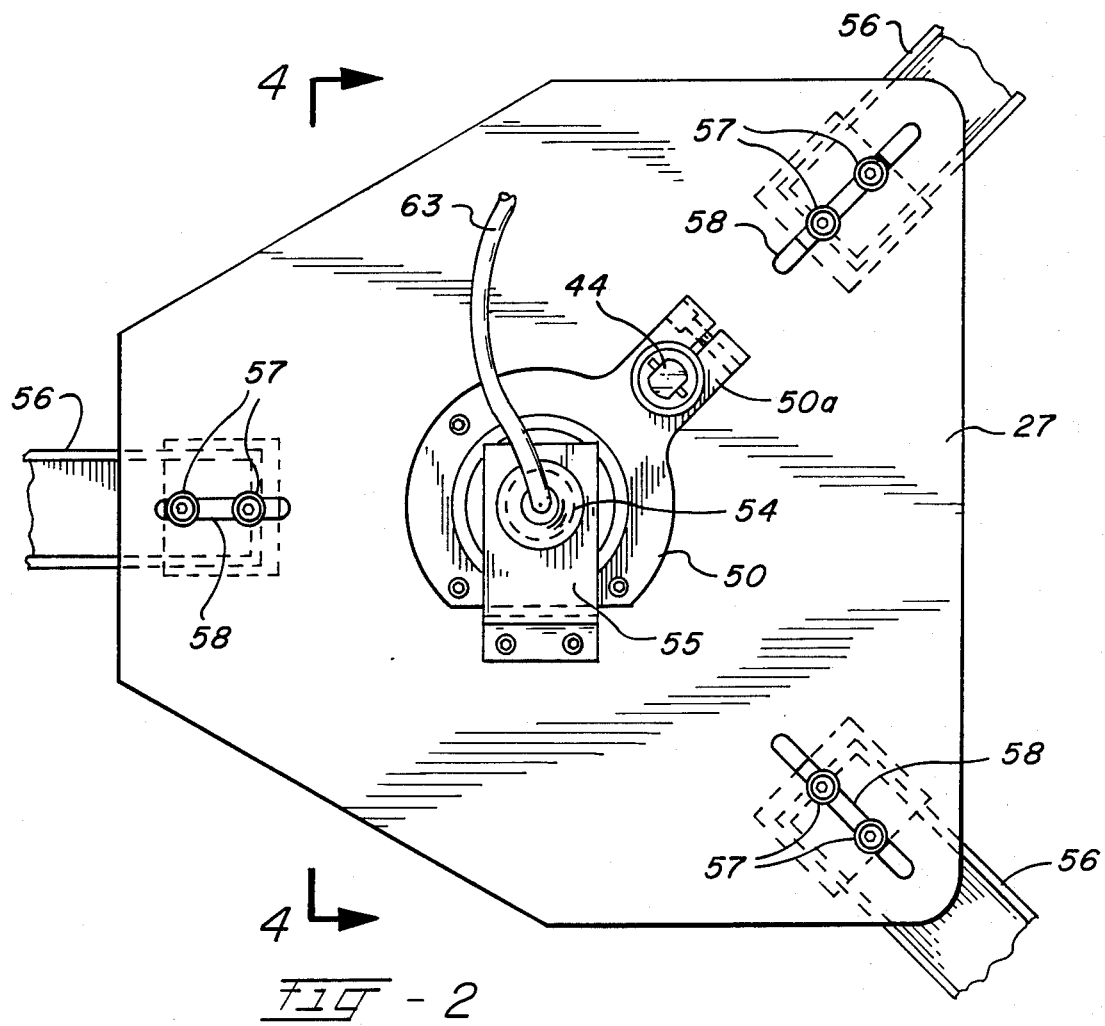

So that imaging assembly 10 can be tilted as desired under either manual or automatic robotic control from a remote position in the usual closed circuit television system (not shown) of which the device of the invention becomes a part, the body of such spherical mount is cut away or notched, as at 21a, to accommodate a sector gear 28, FIG. 4, and an arrangement for moving objective lens tube 22 up and down, see FIG. 5.

such gear 28 is securely fastened to spherical mount 21, as by screws 30, FIG. 1. A drive pinion 31 is affixed to the output shaft 32, FIG. 4, of a remotely controlled, miniature, reversible, electric motor 33, and is in mesh with sector gear 28 for rotating the spherical mount back and forth, depending upon the direction of rotation of motor 33, on stub shafts 34 that project into and are journaled in corresponding receiving openings, respectively, of arms 24 and 25 of mounting structure 11. Accordingly, tilting of imaging assembly 10 is controlled by electric motor 33.

The arrangement for moving objective lens tube 22 up and down comprises a bar 36, FIG. 5, fastened to objective lens tube 22 as by a screw 37, and into which bar the lower threaded end 38a of an output shaft 38 of a remotely controlled, miniature, reversible, electric motor 39 is threaded. Depending upon the direction of rotation of motor 39, objective lens 16 is moved either up or down relative to spherical mount 21.

For robotically adjusting the positions of zoom lenses 17a and 17b, their cam mounting 20, FIG. 5, has a spur gear 40 fastened thereto and exposed through an aperture 23a, FIG. 4, in barrel housing 23 for intermeshing with a drive pinion 41 that is affixed to the output shaft of a remotely controlled, miniature, reversible, electric motor 42. Such motor, as well as motor 38, is conveniently supported by a shelf 43 affixed to and projecting outwardly from barrel housing 23.

Panning of imaging assembly 10 and its objective lens 16 relative to dome fixture 14 is carried out through turntable 26 by remotely controlled, miniature, electric motor 44. The output shaft of such motor carries a drive pinion 45, FIG. 4, intermeshing with a spur gear 46 affixed to turntable 26 below platform 27. Arms 24 and 25 depend from securement at their upper ends to turntable 26, as by means of screws 47. The turntable is rotatably supported by platform 27 by means of a stepped shaft 48, see particularly FIG. 5, passing through the platform and having a portion of reduced diameter journaled in a bearing 49 that is press fit into a housing 50 on the platform. A nut 51 on shaft 48 beyond housing 50 maintains turntable 26 in place. A passage 52 through turntable 26 and its shaft 48 provides for the running therethrough of a composite electrical cable 53 from the lower, rotor end of a slip ring device 54 of well-known construction that permits repeated, full circle rotation of imaging assembly 10. Slip ring device 54 is held in place by a bracket 55. Bearing housing 50 is provided with a clamping arm 50a for holding electric motor 44 in place.

Mounting structure 11 comprises means for removably supporting platform 27 and its associated imaging assembly 10 on and above a ceiling, such as 12, however constructed, but usually one made up of accoustical tiles and lightweight runners on which they rest so that imaging assembly 10 can be readily moved from one dome fixture to another as found expedient from time to time. A dome fixture 14 may be inset into one of the accoustic tiles or, preferably, into a grill of relatively thin material customarily present. In any case, the support means preferably comprises a tripod arrangement adjustably fastened to platform 27. Thus, as best illustrated in FIG. 1, three tripod legs indicated 56, respectively, are fastened, as by means of bolts 57, to platform corners in adjustment slots 58. They are each height adjustable, as by means of a foot pad 59 having a stem 59a threaded into the bottom member 56a of the corresponding tripod leg.

For shutting off tilting motor 33 at opposite terminations of a tilting stroke, respective limit switches (not shown) are provided at the terminal locations for activation by appropriate members (not shown) extending from imaging assembly 10. As, in effect, parking brakes for imaging assembly panning and tilting movements, commercially available power-off brake mechanisms 61 and 62 of well-known type, e.g. units manufactured by Inertia Dynamics, Florida, are provided for activation coincidentally with shut-off of power to the respective electric motors.

Imaging assembly 10 and its mounting 11 are electrically interconnected with a standard type of receiver, control, and decoder box (not shown) of the previously mentioned closed circuit television system by a plug-in composite cable 63, FIG. 1, for supply of power, for transmission of control signals from the console of such television system, if manually operated, or from suitable circuitry if automatically operated, and for return to such television system of electronically processed video signals derived by image-acquisition device 15a, through respective electrical conductors of such cable. Cable 63 connects into the upper, stator end of slip ring device 54 and its respective conductors connect electrically with corresponding conductors of cable 53.

Electrical cable 53 supplies the electronic circuitry (not shown) in an electronic processing box 64 with power and control signals through respective conductors, while respective conductors 65a of a second electrical cable 65, FIG. 4, carry power and electronically processed control signals to the several electric motors 33, 38, 42, and 44. An electrical cable 66 connects image-acquisition device 15a with the electronic camera circuitry in box 64, while respective conductors in cables 53 and 63 carry processed video signals back to the receiver, control, and decoder box of the television system.

As previously indicated, miniaturization of the imaging assembly of the invention is made possible by combining a known image-acquisition device, that has been previously used to a limited extent in video cameras of surveillance systems, with previously known microscope technology modified by suitably regrinding lenses of the lens system as dictated by the new use, modifications that are within the skill of a video optics technician.

Maximum scanning sweep, by the miniaturized imaging assembly, of an area to be watched is made possible by the forward pivoting of the objective lens mount of the imaging assembly for positioning substantially at the concavity of an unusually small dome of a dome fixture. A spherical mount for the objective lens also provides a surface that minimizes tell-tale light reflection through the dome. By blackening the spherical surface of the spherical mount, as by anodizing when such spherical mount is made of aluminum, light reflection is further minimized, if not prevented altogether.

Although it is preferred to utilize a known type of electrically conductive slip ring device 54, which is commercially available (e.g. as produced by Litton Polyscientific) for enabling continuous and unlimited panning rotation of imaging assembly 10, a mounting plate provided with a spiral groove and limit switches at opposite ends of the groove, respectively, for stopping and reversing the panning drive motor at the respective terminations of the spirit track, has been used successfully. Such a non-continuous device could be utilized in place of slip ring device 54 if found advantageous in any instance.

Typical specifications of the illustrated embodiment (well understood by those familiar with the art) are as follows:

| | |
|---|---|
| Angular Travel: | Pan-continous |
| | Tilt-0 to 80 deg. |
| Speed: | Pan-80 deg./sec |
| | Tilt-30 deg./sec |
| Braking and Parking: | +.5 deg. |
| Environmental: | Indoor-Outdoor Dome Fixtures |
| Optical Specifications: | |
| Imager: | ⅔" Interline transfer CCD Pixel-510(H) × 492(V) high resolution Imager |
| Scanning: | 525 lines, 60 Hz, interlace |
| Video Output: | 1.0 Vp-p, Sync Negative, 75 ohm |
| Minimum Illumination: | 2.0 Lux at F = 1.4 |
| TV Line Resolution: | 370 H, 250 V |
| AGC, Gamma: | AGC ON, GAMMA = 0.45 |
| External Sync: | accepts VD, HC sync. |
| Lens: | Focal Length-12 mm to 76 mm Field of View Hi Mag 4.6 deg. × 6.2 deg. Lo Mag 30 deg. |
| Zoom Assembly: | 7.5 to 1 zoom power |
| Weight: | Approx. 10 lbs |
| Input Voltage: | 115 VAC, 60 Hz |
| Power Consumption: | Transmitter-2.5 VA Receiver-115 VAC; 5 VA Pan/Tilt Supply-115 VAC 140 VA Max.; 6 VDC: 50 VA Lens supply-0-4 VA Max Camera supply-15 VA |
| Control Method: | 15-pulse train (pulse width modulated) superimposed on the video signal during the vertical interval by the Control Transmitter. Pulse train occupies 1 TV line period. |
| Pulse Amplitude: | Approx. 1 V p-p added to video signal, 333 KHZ nom. |
| Connectors: | Control Transmitter-3 BNC connectors. Receiver-Video input and output BNC. Control output, AMP Series CPC. |
| Input Video Level: | 1 V p-p nominal; 2 V p-p at less than 75% APL; 1.5 V p-p max at 90% APL |
| System Bandwidth: | Less than 2 db down at 10 MHZ |
| Power Cord: | 3-wire grounded No. 18 AWG, TRA/REC |
| Ambient Temp: | −40 DEG. F. to +140 DEG. F. |

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. An integrated imaging assembly and mounting therefor particularly for surveillance viewing under remote control from a closed circuit television system, said imaging assembly comprising an optical lens arrangment including, among other lenses, an objective lens, a mount for said objective lens, and an electronic, charge-coupled, image-acquisition device optically aligned with said lens arrangement for receiving images therefrom; mounting means for said imaging assembly; means pivotally mounting said objective lens mount in said mounting means rearwardly of but adjacent to said objective lens, so the objective lens and the forward portion of said objective lens mount can be placed within a concave viewing dome of unusually small and shallow size, with the remainder of said imaging assembly and mounting therefor substantially wholly outside of and behind the concavity of the viewing dome, and can be tilted and panned to sweep over a broad viewing area with minimum protrusion thereinto; remotely controlled means for tilting said objective lens mount; remotely controlled means for panning said objective lens mount; remotely controlled means for adjusting the positions of lenses in said lens arrangement; and electronic video camera means with which said charge-coupled, image-acquisition device is electrically connected.

2. An integrated imaging assembly and mounting therefor according to claim 1, wherein the objective lens and the other lenses of the lens arrangement are of microscope type that are miniature relative to the lenses of a standard video surveillance system.

3. An integrated imaging assembly and mounting therefor according to claim 2, wherein the remotely controlled means for adjusting the positions of lenses in the lens arrangement comprises remotely controlled, miniature, electric motors for respective lenses; and drive means between said motors and the respective lenses.

4. An integrated imaging assembly and mounting therefor particularly for surveillance viewing under remote control from a closed circuit television system, said imaging assembly comprising an optical lens arrangement including, among other lenses, an objective lens, a mount for said objective lens, an an electronic, charge-coupled, image-acquisition device optically aligned with said lens arrangement for recieving images therefrom; mounting means for said imaging assembly; means pivotally mounting said objective lens mount in said mounting means rearwardly of but adjacent to said objective lens, so the forward end of said objective lens mount can be placed within a concave viewing dome of unusually small and shallow size, with the remainder of said imaging assembly outside of and behind the concavity of the viewing dome, and can be tilted and panned to sweep over a broad viewing area with minimum protrusion thereinto; remotely controlled means for tilting said objective lens mount; remotely controlled means for panning said objective lens mount; remotely controlled means for adjusting the positions of lenses in said lens arrangement; and electronic video camera means with which said image-acquisition, charge-coupled device is electrically connected, the mount for the objective lens being spherical in shape and pivoted on an axis extending transversely of and normal to the optical axis of said objective lens.

5. An integrated imaging assembly and mounting therefor according to claim 4, wherein the spherical mount for the objective lens has a black, outer, spherical surface.

6. An integrated imaging assembly and mounting therefor according to claim4, wherein the remotely controlled means for tilting the objective lens mount comprises a sector gear fastened to said mount internally of its spherical shape; a drive pinion n mesh with said sector gear; and a miniature, reversible, electric motor for rotating said drive pinion in opposite directions.

7. An integrated imaging assembly and mounting therefor particularly for surveillance viewing under remote control from a closed circuit television system, said imaging assembly comprising an optical lens arrangement including, among other lenses, an objective lens, a mount for said objective lens, and an electronic, charge-coupled, image-acquisition device optically aligned with said lens arrangement for recieving images therefrom; mounting means for said imaging assembly; means pivotally mounting said objective lens mount in said mounting means rearwardly of but adjacent to said objective lens, so the forward end of said objective lens mount can be placed within a concave viewing dome of unusually small and shallow size, with the remainder of said imaging assembly outside of and behind the concavity of the viewing dome, and can be tilted and panned to sweep over a broad viewing area with minimum protrusion thereinto; remotely controlled means for tilting said objective lens mount; remotely controlled means for panning said objective lens mount; remotely controlled means for adjusting the positions of lenses in said lens arrangement; and electronic video camera means with which said image-acquisition, charge-coupled device is electrically connected, the imaging assembly mounting means comprising a turntable; mounting means for said turntable; and a pair of arms depending from said turntable, the objective lens mount being pivotally mounted in and between the lower ends of the arms of said pair; the remotely controlled means for panning the objective lens mount comprising a remotely controlled, miniature, electric motor; and drive means between said electric motor and said turntable.

8. An integrated imaging assembly and mounting therefor according to claim 7, wherein the components of the imaging assembly are physically aligned longitudinally of and between the arms of the pair and are rigidly interconnected so as to tilt with the objective lens mount relative to said arms.

9. An integrated imaging assembly and mounting therefor according to claim 8, wherein the electronic camera means is mounted on one of the arms of the pair; wherein electric cable means adapted for connection into a closed circuit television system passes into the imaging assembly through the turntable and is connected with the electronic camera means and the motor means; and wherein means are provided adjacent to said turntable for preventing said cable from undue twisting.

10. An integrated imaging assembly and mounting therefor according to claim 9, wherein the means provided to prevent undue twisting of the cable is a slip ring device.

11. An integrated imaging assembly and mounting therefor according to claim 7, wherein the mounting means for the turntable comprises a platform in which the turntable is mounted, and a plurality of legs depending from said platform to terminations in feet adapted to rest on a supporting surface about at the pivoting level of the objective lens mount.

12. An integrated imaging assembly and mounting therefor according to claim 11, wherein the feet are height adjustably attached to the lower ends of the legs.

13. An integrated imaging assembly and mounting therefor according to claim 12, wherein the positions of the legs are laterally adjustable relative to the 14. An integrated imaging assembly and mounting therefor according to claim 7, including electrically-operated parking brake means for holding the objective lens mounting and the turntable, respectively, in position upon de-energization of their motor means.

15. An integrated imaging assembly and mounting therefor according to claim 7, wherein the objective lens and the other lenses of the lens arrangement are of microscope type that are miniature relative to the lenses of a standard video surveillance camera.

16. An integrated imaging assembly and mounting therefor according to claim 15, wherein the remotely controlled means for adjusting the positions of lenses in the lens arrangement comprises remotely controlled, miniature, electric motors for respective lenses; and drive means between said motors and the respective lenses.

17. An integrated imaging assembly and mounting therefor according to claim 15, wherein the mount for the objective lens is spherical in shape and is pivoted on an axis extending transversely of and normal to the optical axis of said objective lens.

18. An integrated imaging assembly and mounting therefor according to claim 17, wherein the spherical mount for the objective lens has a black, outer, spherical surface.

19. An integrated imaging assembly and mounting therefor according to claim 17, wherein the remotely controlled means for tilting the objective lens mount comprises a sector gear fastened to said mount internally of its spherical shape; a drive pinion in mesh with said sector gear; and a miniature, reversible, electric motor for rotating said drive pinion in opposite directions.

20. An inconspicuous but broad sweep surveillance video viewing installation, comprising a concave viewing dome of unusually small size and shallow depth positioned for broad sweep viewing with its concavity facing upwardly; an integrated imaging assembly and mounting therefor adapted for interconnection with a closed circuit television system, said imaging assembly comprising an optical lens arrangement including, among other lenses, an objective lens, a mount for said objective lens, and an electronic, charge-coupled, image-acquisition device optically aligned with said lens arrangement for receiving images therefrom; mounting means for said imaging assembly positioned above and substantially wholly outside the concavity of said dome; means pivotally mounting said objective lens mount in said mounting means rearwardly of but adjacent to said objective lens at about the level of the opening of the concavity of the dome, so the objective lens and forward portion of said objective lens mount is within said dome, with the remainder of said imaging assembly and mounting therefor substantially wholly outside of and behind the concavity of the dome, and can be tilted and panned to sweep over a broad viewing area with minimum protrusion thereinto; remotely controlled means for tilting said objective lens mount; remotely controlled means for panning said objective lens mount; remotely controlled means for adjusting the positions of lenses in said lens arrangement; and electronic video camera means with which said image-acquisition, charge-coupled device is electrically connected.

21. A surveillance video viewing installation according to claim 20, wherein the objective lens and the other lenses of the lens arrangement are of microscope type that are miniature relative to the lenses of a standard video surveillance system.

22. A surveillance video viewing installation according to claim 21, wherein the remotely controlled means for adjusting the positions of lenses in the lens arrangement comprises remotely controlled, miniature, electric motors for respective lenses; and drive means between said motors and the respective lenses.

23. A surveillance video viewing installation according to claim 20, wherein the mount for the objective lens is spherical in shape and is pivoted on an axis extending transversely of and normal to the optical axis of said objective lens.

24. A surveillance video viewing installation according to claim 23, wherein the spherical mount for the objective lens has a black, outer, spherical surface.

25. A surveillance video viewing installation according to claim 23, wherein the remotely controlled means for tilting the objective lens mount comprises a sector gear fastened to said mount internally of its spherical shape; a drive pinion in mesh with said sector gear; and a miniature, reversible, electric motor for rotating said drive pinion in opposite directions.

26. A surveillance video viewing installation according to claim 20, wherein the imaging assembly mounting means comprises a turntable; mounting means for said turntable; and a pair of arms depending from said turntable, the objective lens mount being pivotally mounted in and between the lower ends of the arms of said pair; and wherein the remotely controlled means for panning the objective lens mount comprises a remotely controlled, miniature, electric motor; and drive means between said electric motor and said turntable.

27. A surveillance video viewing installation according to claim 26, wherein the components of the imaging assembly are physically aligned longitudinally of and between the arms of the pair and are rigidly interconnected so as to tilt with the objective lens mount relative to said arms.

28. A surveillance video viewing installation according to claim 27, wherein the electronic camera mans is mounted on one of the arms of the pair; wherein electric cable means adaped for connection into a closed circuit television system passes into the imaging assembly through the turntable and is connected with the electronic camera means and the motor means; and wherein means are provided adjacent to said turntable for preventing said cable from undue twisting.

29. A surveillance video viewing installation according to claim 28, wherein the means provided to prevent undue twisting of the cable is a slip ring device.

30. A surveillance video viewing installation according to claim 26, wherein the mounting means for the turntable comprises a platform in which the turntable is mounted, and a plurality of legs depending from said platform to terminations in feet adapted to rest on a supporting surface about at the pivoting level of the objective lens mount.

31. A surveillance video viewing installation according to claim 30, wherein the feet are height adjustably attached to the lower ends of the legs.

32. A surveillance video viewing installation according to claim 31, wherein the positions of the legs are laterally adjustable relative to the platform.

33. A surveillance video viewing installation according to claim 26, including electrically-operated parking brake means for holding the objective lens mounting and the turntable, respectively, in position upon de-energization of their motor means.

34. A surveillance video viewing installation according to claim 26, wherein the objective lens and the other lenses of the lens arrangement are of microscope type that are miniature relative to the lenses of a standard video surveillance system.

35. A surveillance video viewing installation according to claim 34, wherein the remotely controlled means for adjusting the positions of lenses in the lens arrangement comprises remotely controlled, miniature, electric motors for respective lenses; and drive means between said motors and the respective lenses.

36. A surveillance video viewing installation according to claim 34, wherein the mount for the objective lens is spherical in shape and is pivoted on an axis extending transversely of and normal to the optical axis of said objective lens.

37. A surveillance video viewing installation according to claim 36, wherein the spherical mount for the objective lens has a black, outer, spherical surface.

38. A surveillance video viewing installation according to claim 36, wherein the remotely controlled means for tilting the objective lens mount comprises a sector gear fastened to said mount internally of its spherical shape; a drive pinion in mesh with said sector gear; and a miniature, reversible, electric motor for rotating said drive pinion in opposite directions.

* * * * *